United States Patent

Gundlach et al.

[11] Patent Number: 5,928,416
[45] Date of Patent: Jul. 27, 1999

[54] DIPROPYLENE GLYCOL AND COUNTERCATION ACTIVATION OF DODECYLBENZENESULFONATE IN THERMAL INK JET INKS

[75] Inventors: Kurt B. Gundlach, Fairport; Richard L. Colt, Rochester; Edward L. Radigan, Jr., Caledonia, all of N.Y.

[73] Assignee: Xerox Corporation, Stamford, Conn.

[21] Appl. No.: 08/812,635

[22] Filed: Mar. 7, 1997

[51] Int. Cl.⁶ .................................................. C09D 11/02
[52] U.S. Cl. ................................. 106/31.58; 106/31.49; 106/31.59; 106/31.78; 106/31.86; 106/31.87
[58] Field of Search ................................. 106/31.58, 31.59, 106/31.86, 31.87, 31.49, 31.78

[56] References Cited

U.S. PATENT DOCUMENTS

| | | | |
|---|---|---|---|
| 4,026,713 | 5/1977 | Sambucetti et al. | 106/31.64 |
| 4,508,570 | 4/1985 | Fuji et al. | 106/31.43 |
| 4,737,190 | 4/1988 | Shimada et al. | 106/31.48 |
| 4,914,562 | 4/1990 | Abe et al. | 347/63 |
| 5,019,166 | 5/1991 | Schwartz | 106/31.43 |
| 5,106,416 | 4/1992 | Moffatt et al. | 106/31.58 |
| 5,116,409 | 5/1992 | Moffatt | 106/31.43 |
| 5,133,803 | 7/1992 | Moffatt | 106/31.53 |
| 5,211,747 | 5/1993 | Breton et al. | 106/31.58 |
| 5,254,159 | 10/1993 | Gundlach et al. | 106/31.43 |
| 5,531,815 | 7/1996 | Gundlach et al. | 106/31.43 |
| 5,540,765 | 7/1996 | Gundlach et al. | 106/31.43 |

FOREIGN PATENT DOCUMENTS

| | | |
|---|---|---|
| 165470 | 7/1988 | Japan . |
| A-63-165465 | 7/1988 | Japan . |

Primary Examiner—Helene Klemanski
Attorney, Agent, or Firm—Oliff & Berridge, PLC

[57] ABSTRACT

An ink jet ink composition includes a liquid medium, a colorant, a dodecylbenzenesulfonate salt and a co-solvent.

10 Claims, No Drawings

DIPROPYLENE GLYCOL AND COUNTERCATION ACTIVATION OF DODECYLBENZENESULFONATE IN THERMAL INK JET INKS

BACKGROUND OF THE INVENTION

The invention relates to a thermal ink jet composition, a printing process and a method of improving the fast dry characteristics of inks.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or to a specific location on a recording medium. In drop-on-demand systems, a droplet is expelled from an orifice directly to a position on a recording medium in accordance with digital data signals. A droplet is not formed or expelled unless it is to be placed on the recording medium.

Quality thermal ink jet printing can be achieved by utilizing an aqueous ink composition containing at least one dye or pigment, a wetting agent and water. U.S. Pat. No. 4,508,570 to Fujii et al. discloses an aqueous ink for ink jet printing, which comprises a water-soluble direct dye and/or acid dye, a polyhydric alcohol and/or an alkyl ether thereof, water, and at least one water-soluble non-ionic surface active agent selected from a specified polyoxyethylene alkyl amine, a specified polyoxyethylene alkyl phenyl ether and a specified polyoxyethylene alkyl ether.

U.S. Pat. No. 4,026,713 to Sambucetti et al. relates to a magnetic ink containing non-ionic, cationic and/or anionic surfactants. The surfactants may include glycerol, a lower alkyl monoether of ethylene glycol and/or a polyethylene diol.

U.S. Pat. No. 4,914,562 to Abe et al. discloses an ink jet composition containing an ionic surface active agent or a non-ionic surface active agent. The ionic surface active agent can be a dioctyl sulfosuccinate sodium salt, sodium oleate or dodecylbenzenesulfonic acid. The non-ionic surface active agent may be diethylene glycol mono-n-butyl ether or triethylene glycol mono-n-butyl ether.

U.S. Pat. No. 5,019,166 to Schwarz relates to a thermal ink jet printing composition comprising a dye, a liquid medium and a surfactant selected from the group consisting of polyoxyalkylated ethers, anionic bitail fluorothio alkyls, alkyl aryl sulfonates, alkyl amine quaternary salts and mixtures thereof.

U.S. Pat. No. 5,116,409 to Moffatt discloses a process for reducing color bleed of inks employed in thermal ink jet printing. The process comprises printing two inks side by side, each ink having a composition comprising (a) a vehicle and (b) about 0.1 to 10 wt. % of at least one water-soluble anionic dye. The vehicle comprises at least one member selected from the group consisting of zwitterionic surfactants and non-ionic amphiphiles and water or water and an organic solvent. Moffatt discloses a composition that includes SURFYNOL S465, an acetylenic polyethylene oxide, and 1,5-pentanediol.

U.S. Pat. No. 5,254,159 to Gundlach et al., the entire disclosure of which is herein incorporated by reference, discloses an ink composition that comprises water, an anionic dye and an amine compound. The ink composition provides waterfast images. U.S. Pat. No. 5,540,765 to Gundlach et al., the entire disclosure of which is incorporated herein by reference, discloses an ink jet printing composition containing a surfactant comprising an alkylsulfoxide and preferably containing a betaine zwitterionic base and dibutylsulfoxide. U.S. Pat. No. 5,531,815 to Gundlach et al., the entire disclosure of which is herein incorporated by reference, discloses a thermal ink jet printing composition that contains a betaine zwitterionic base and a quasisurfactant penetrant.

Japanese Patent Abstract 88-165465, the entire disclosure of which is incorporated herein by reference, discloses a quick-drying ink jet ink composition containing sodium dodecylbenzenesulfonate and a mixture of a polyhydric alcohol (e.g., glycerol) and a polyhydric alcohol derivative (e.g., diethylene glycol monobutyl ether).

Full color printing in a thermal ink jet printing process requires an ink with fast dry characteristics. Fast dry characteristics can be improved by the addition of a penetrant. A penetrant imparts quick-dry characteristics to a thermal ink jet ink composition.

However, effectiveness of a penetrant in providing quick-dry characteristics varies with ink composition solvent. Some penetrants do not provide acceptable quick-dry characteristics to some ink-solvent systems. Co-solvents can be added to ink compositions to improve effectiveness of the penetrant, or the penetrant concentration in the ink compositions can be increased to achieve satisfactory quick-dry characteristics. However, some co-solvent packages and/or higher penetrant concentrations cause deterioration of thermal ink jet hardware. For example, higher loads (i.e., weight percentage) of butylcarbitol or higher loads of cyclohexyl pyrrolidinone aggressively attack cartridge materials and seals. Effectiveness of penetrants in providing quick-dry characteristics varies with ink solvents. Many surfactants such as Merpols and Surfynols are chemically aggressive towards thermal ink jet printhead materials. Utilization of the standard quasisurfactant penetrants such as butylcarbitol and cyclohexylpyrrolidinone also compromise the integrity of thermal ink jet printhead materials when used in otherwise appropriate loadings.

Thus, there continues to be a need for ink jet ink compositions having fast dry characteristics and that do not cause deterioration of ink jet ink hardware.

SUMMARY OF THE INVENTION

The present invention relates to an improved thermal ink jet printing composition containing a liquid vehicle, a colorant, a dodecylbenzenesulfonate salt, and a co-solvent.

In particular, in embodiments of the present invention, triethanolammonium (TEA), isopropylammonium (Ipr), tetramethylammonium (TMA), sodium (Na), ammonium ($NH_4$) and lithium (Li) salts of dodecylbenzenesulfonic acid, $C_{10}H_{20}C_6H_5SO_3H$, are used with a dipropylene glycol co-solvent. The present invention also relates to using sodium and isopropylammonium salts of DBS with co-solvents other than dipropylene glycol.

The dodecylbenzenesulfonate (DBS) salts of the present invention are chemically compatible with thermal ink jet ink printhead hardware and materials. Fluid seal adhesives are the most vulnerable of all cartridge materials tested to attack by penetrants.

The combination of a DBS salt and a specific co-solvent provides an ink with dramatically enhanced penetration and with significantly reduced dry time on plain papers. The dramatically enhanced reduction in dry times permits formulation of fast drying inks with low co-solvent loads. Fast dry, full color ink sets can be provided by the present invention without high loads of additives that deteriorate thermal ink jet hardware materials.

The present invention also relates to a thermal ink jet printing process comprising ejecting an ink jet composition comprising a DBS salt and a specific co-solvent in an imagewise fashion from a thermal ink jet printer onto a substrate.

In addition, the present invention is directed to a method of improving fast dry characteristics of thermal ink jet inks comprising incorporating into a thermal ink jet composition a combination of a DBS salt and an appropriate co-solvent.

DETAILED DESCRIPTION OF PREFERRED EMBODIMENTS

Inks of the present invention comprise a liquid vehicle, a dodecylbenzenesulfonate salt, a co-solvent and a colorant.

For the purposes of this invention, the dodecylbenzenesulfonate sulfonate is a surfactant (e.g., having a hydrocarbon tail of 10 or more straight chain carbon atoms). A quasisurfactant is a penetrant that contains a hydrocarbon tail of about 4–8 carbons atoms. Butylcarbitol and cyclohexylpyrrolidinone are examples of quasisurfactants.

The ink jet inks of the present invention contain a liquid medium or vehicle. Frequently, water comprises the major portion of the liquid medium and, while it may comprise 100 weight percent of the liquid medium, water is generally present in an amount of from about 7 weight percent to about 93 weight percent by weight of total ink weight, and preferably from about 55 to about 85 weight percent by weight of total ink weight.

Dodecylbenzenesulfonate, $C_{10}H_{20}C_6H_5SO_3^-$, is an anionic surfactant with excellent shelf stability in aqueous solutions. It has been found to have applicability in creating "fast dry" thermal ink jet ink compositions. In order to minimize the loading (i.e., weight percentage based upon total ink weight) of this surfactant, it has been discovered that its activity can be increased through proper selection of a DBS salt of the surfactant in combination with a co-solvent.

DBS salts include, but are not limited to, triethanolammonium, isopropylammonium, tetramethylammonium ammonium, lithium and sodium salts of dodecylbenzenesulfonic acid. The ink jet inks of the present invention generally comprise from about 0.2 to about 1.0 weight percent of DBS salt based on total ink weight, preferably between about 0.3 to about 0.8 weight percent.

Sodium, Ipr, TMA and TEA salts of DBS show increased penetration activity in the presence of a dipropylene co-solvent. Dipropylene glycol incorporation into thermal ink jet inks improves functionality in the hardware through the increased viscosity and humectant nature of the ink. The increased penetration of DBS salts are demonstrated in the Examples for several inexpensive, commercially available DBS salts.

Moreover, the sodium (Na) and isopropylammonium (Ipr) countercations show increased penetration activity in the presence of co-solvents other than dipropylene glycol, including, but not limited to, glycerol, diethylene glycol, ethylene glycol, trimethylol propane, sulfolane, n-methylpyrrolidinone, thiodiethanol, and imidazole. The amount of co-solvent or humectant in the ink jet inks of the present invention generally ranges from about 8 to about 20 weight percent based on total ink weight, preferably about 10 to about 15 weight percent based on total ink weight. However, amounts outside of these ranges may suitably be used depending upon particular co-solvent systems and desired ink characteristics.

Inks of the present invention comprise a dye colorant. Generally, any effective dye, such as one of the direct dyes or the acid dyes, may be selected, provided that the dye is compatible with the other ink components and is soluble in the liquid medium. Similarly, inks of the present invention comprise a pigment colorant. Generally, any effective pigment may be selected, provided that the pigment is compatible with the other ink components.

Examples of a suitable pigments include self dispersing carbon black Cab-o-jet, available from Cabot; dispersed carbon blacks, available from Sun Company and Bayer; and colored pigments, available from Sun Company.

Examples of suitable dyes include Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GFT Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company; Spirit Fast Yellow 3G; Aizen Spilon Yellow C-GNH (Hodagya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Severon Blue 5GMF (ICI); Basacid Blue 750 (BASF); and the like. Typical preferred dyes include Bernacid Red, available from Berncolors, Pontamine Brilliant Bond Blue, Berncolor A. Y. 34, Basacid Black X34, Carta Black 2 GT, Telon Fast Yellow 4GL-175, and the Like.

The dye is generally present in the ink composition in an effective amount, generally from about 0.5 to about 8 percent by weight of total ink weight, and preferably from about 1 to about 6 percent by weight of total ink weight. Similarly, in embodiments of the present invention where pigments are used, the pigment may be present in the ink jet ink composition in any effective amount either with or without the presence of a dye. Typically the pigment is present in an amount of from about 0.1 to about 15 percent by weight of total ink and preferably from about 0.5 to about 10 percent by weight of total ink weight, although the amount can be outside of this range.

Optionally, the ink composition can include a biocide such as Dowicil 150 and Dowicil 200 (Dow Chemical Company), sorbic acid, vinylene-bis thiocyanate, commercially available as Cytox 3711 (American Cyanamid Company), disodium ethylenebisdithiocarbamate, commercially available as Dithone D14 (Rohm & Haas Company), bis (trichloromethyl) sulfone, commercially available as Biocide N-1386 (Stauffer Chemical Company), zinc pyridimethione, commercially available as zinc omadine (Olin Corporation), 2-bromo-t-nitropropane-1,3-diol, commercially available as onyxide 500 (Onyx Chemical Company), Bosquat MB50 (Louza, Inc.) and the like may be present in the inks of the present invention. When present, the biocide is in an effective amount, generally from about 0.01 to about 1 percent by weight of total ink weight, and preferably from about 0.05 to about 0.2 percent by weight of total ink weight.

Other components may also be incorporated into the inks of the present invention. For example, inks of the present invention may include such additives as buffering agents, anti-mold agents, pH adjustment agents, electric conductivity adjustment agents, chelating agents, anti-rusting agents, and the like. Such additives may be included in the ink jet inks of the present invention in any effective amount, as desired. For example, such additives may be included in an amount ranging from about 0.0001 to about 4.0 percent by weight of total ink weight, and preferably from about 0.01 to about 2.0 percent by weight of the ink of total ink weight. More preferably, such additives may be included in an amount ranging from about 0.01 to about 0.5 percent by weight of total ink weight and most preferably from about 0.05 to about 0.3 percent by weight of total ink weight. The amount included will depend, of course, on the specific component being included.

Examples of buffering agents include, but are not limited to, agents such as sodium borate, sodium hydrogen phosphate, sodium dihydrogen phosphate, mixtures thereof and the like.

Additional pH controlling agents may also be included in the ink, if desired. Examples of such pH controlling agents suitable for inks of the present invention include, but are not limited to, acids; bases, including hydroxides of alkali metals such as lithium hydroxide, sodium hydroxide and potassium hydroxide; phosphate salts; carbonate salts; carboxylate salts; sulfite salts; amine salts; amines such as diethanolamine and triethanolamine; mixtures thereof and the like. When present, the pH controlling agent is preferably included in an amount of up to about 1 percent by weight of total ink weight, and preferably from about 0.01 to about 1 percent by weight of total ink weight.

Other additives may also be added. For example, trimethylol propane may be added to the ink jet ink compositions, for example, to reduce paper curl or as an anti-cockle agent.

Other suitable additives are disclosed, for example, in U.S. Pat. No. 4,737,190 to Shimada et al., the entire disclosure of which is incorporated herein by reference.

Additional advantages of the combination surfactant of the present invention include improved solid area covering quality, elimination of decapped front face ink cartridge "weep" and improved print cartridge decapped print recoverability. Decapped face ink "weep" can occur when a print cartridge is left open and ink floods out of the nozzles onto the cartridge front face plate. In one test for "weep," a cartridge is removed from a printer and the front face of the cartridge is cleaned with a vacuum wand. The cartridge is then permitted to set uncapped to evaporate ink from nozzle orifices. "Weep" occurs when the ink does not evaporate, but rather oozes from nozzles and forms a crystalline ink deposit on the cartridge front face. "Decapped recoverability" describes the quality of print provided after the cartridge is replaced into the printer. Immediate recoverability means that the cartridge immediately begins to print clearly in acceptable quality.

The ink compositions of the present invention are of a viscosity suitable for use in thermal ink jet printing processes. Typically, the ink viscosity is no more than about 5 centipoise (cP), and preferably is from about 1 to about 2.5 centipoise. It is also preferred that the ink jet ink composition has a surface tension of from about 20 to about 70 dynes/cm at 25° C. More preferably, the surface tension is from about 25 to about 60 dynes/cm, and even more preferably from about 30 to about 40 dynes/cm.

Ink composition of the present invention can be prepared by any suitable process. Typically, the inks are prepared by simple mixing of the constituent ingredients. One process entails mixing all of the ink ingredients together and filtering the mixture to obtain an ink. For example, the inks of the present invention can be prepared by mixing the ingredients, heating if desired, and filtering, followed by adding the DBS salt of the present invention to the mixture and mixing at room temperature with moderate shaking until a homogeneous mixture is obtained, typically from about 5 to about 20 minutes. Alternatively, the DBS surfactant of the present invention can be mixed with the other ink ingredients during the ink preparation process.

Ink pH is adjusted to a desired level at any appropriate time during the preparation process. Typically, pH adjustment occurs subsequent to most of the other ink preparation steps by addition of an acid and a buffer. Preferably the pH adjustment occurs prior to filtration so that any solid precipitates caused by pH adjustment can be removed from the ink during the filtration step.

The present invention is also directed to a process that comprises incorporating an ink composition of the present invention into an ink jet printing apparatus and ejecting droplets of the ink composition in an imagewise pattern onto a substrate. In an embodiment of the invention, the printing apparatus employs a thermal ink jet process wherein the ink in nozzles is selectively heated, thereby causing droplets of the ink to be ejected in an imagewise pattern.

The printing process of the invention can be employed on any suitable print substrate, including plain papers such as Xerox® 4024 papers, ruled notebook paper, and bond paper; silica coated papers such as Sharp Company silica coated paper, JuJo paper, and the like; transparency materials; fabrics; textile products; plastic; polymeric films; inorganic substrates such as metals and wood; and the like. In one embodiment, the process comprises printing onto a porous or ink absorbent substrate, such as plain paper or thermal ink jet transparencies.

The invention will further be illustrated in the following, non-limiting examples, it being understood that these examples are intended to be illustrative only and that the invention is not intended to be limited to the materials, conditions, process parameters and the like recited therein.

In the Tables of the Examples, RM is Roll Mill, RO is reverse osmosis processed water, PEO is a polyethylene oxide/bisphenol A adduct, MW is a weight average molecular weight, and EDTA is ethylenediaminetetraacidic acid. Dry time of inks (DT), where indicated, is determined by a wire wand bar draw down test. A wand with a wrapped wire (#8) saturated with ink composition is drawn down a paper to deposit ink. The dry time on the paper is then measured.

EXAMPLES

Example 1:

The ink jet ink compositions of Table 1 are formed containing a DBS salt, a co-solvent, 35 wt. %, Project Cyan 1 Liquid, and remainder of water to 100 wt. %. The ink jet inks are jetted onto a paper substrate and then tested for dry time.

As indicated in Table I, dipropylene glycol activates the penetration of an ink jet ink containing a DBS salt. The synergistic effect of DBS salts and a dipropylene glycol co-solvent on the penetration of thermal ink jet inks is demonstrated by significantly shorter dry times compared to other co-solvents.

TABLE I

| DBS SALT/wt. % | CO-SOLVENT/wt. % | DT/sec. |
| --- | --- | --- |
| isopropylammonium/0.5 | dipropyleneglycol/12 | 1 |
| isopropylammonium/0.5 | glycerol/15 | 4 |
| isopropylammonium/0.5 | diethyleneglycol/15 | 5 |
| isopropylammonium/0.5 | ethyleneglycol/15 | 5 |
| isopropylammonium/0.5 | trimethylolpropane/15 | 3 |
| isopropylammonium/0.5 | water control | 15 |
| isopropylammonium/0.5 | sulfolane/10 | 6 |
| isopropylammonium/0.5 | N-methylpyrroldinone/10 | 4 |
| tetramethylammonium/1.0 | dipropyleneglycol/12 | 1 |
| tetramethylammonium/1.0 | glycerol/12 | 3 |
| triethanolammonium/1.0 | dipropyleneglycol/15 | 1 |
| triethanolammonium/1.0 | glycerol/15 | 12 |
| sodium/0.5 | dipropyleneglycol/12 | 1 |
| sodium/0.5 | glycerol/12 | 5 |

Example 2:

In a bottle are mixed 30.36 grams of RO water, 1.09 gram of tris(hydroxymethyl) aminomethane (Weight Average MW=121) and 0.76 gram EDTA. The bottle is placed on a roll mill for fifteen minutes. Thereafter, an additional 88.01 grams of RO water, 0.1008 gram PEO and 0.2013 gram of Dowicil 200 are added to the mixture and the bottle is placed on a roll mill for an additional ten minutes. 34.08 grams of glycerol, 2.95 grams dodecylbenzenesulfonic acid isopropylammonium salt, 30.05 grams of Project Cyan 1 Liquid (10% Dye Solids) and 3.01 grams of Duasyn Acid Blue are added and the mixture is placed on the roll mill for an additional 30 minutes. RO water, 9.27 grams, is added to bring the total weight of ink composition to 200 grams and the ink composition is roll milled for an additional ten minutes. The ink composition is summarized in Table II.

Filter time of the ink composition with a 0.2 micron ink filter at 60 psi pressure is 6 minutes. The ink produces a mild bubble and the filter is clean. A portion of the ink, 10 grams, is loaded into a print cartridge and the cartridge is placed in a printer. After printing, the print cartridge is removed, decapped and set uncapped for a period of one day. No ink weep is noted. The ink provides good quality printing on a Xerox thermal ink jet transparency though moderate stitching is noted. Dry time is 2 seconds. Recoverability is 15 pages. Recoverability is the number of pages required to achieve all jets firing properly, without priming (vacuum) or front face wiping.

TABLE II

| INGREDIENT/DESCRIPTION - 200 g Ink | Amount, g | Soln. % |
| --- | --- | --- |
| RO Water | 30.36 | |
| Tris(Hydroxymethyl)aminomethane (MW = 121) | 1.09 | 0.55 |
| Versene (EDTA, Technical Grade) | 0.76 | 0.37 |
| Roll Mill 15 min., Homogeneous | N/A | N/A |
| RO Water | 88.01 | |
| PEO | 0.1008 | 0.05 |
| Dowicil 200, Roll Mill 10 min., Homogeneous | 0.2013 | 0.1 |
| Glycerol UP S (Glycerine) | 34.08 | 17 |
| Ipr DBS salt (Naxel AAS Special 3) | 2.95 | 1.5 |
| Project Cyan 1 Liquid (10% Direct Blue 199 Dye Solids) | 30.05 | 1.5 |
| DUASYN Acid Blue | 3.01 | 1.5 |
| Roll Mill 30 min., Homogeneous with moderate foam | N/A | N/A |
| pH 7.37 | N/A | N/A |
| Ink Weight = 190.73 g, RO Water to 200 g ink, Roll mill 10 min. | 9.27 | |
| Homogeneous, Filter 0.2 μm | N/A | N/A |
| Viscosity = 2.10 cP, | | |
| Surface Tension = 31.8 dynes/cm | | |

Examples 3-4:

Ink compositions are prepared according to the descriptions in the following Tables III-IV and as described in Example 1. The compositions are tested for filter time, dry time, decap recoverability and transparency coverage with the results as summarized after each Table. In the Tables III-IV, the abbreviations are the same as in Table II.

TABLE III (Example 3)

| INGREDIENT/DESCRIPTION - 200 g Ink | Amount, g | Soln. % |
| --- | --- | --- |
| RO Water | 29.85 | |
| Tris(Hydroxymethyl)aminomethane (MW = 121) | 1.0 | 0.5 |
| Versene (EDTA, Technical Grade) | 0.7 | 0.35 |
| Roll Mill 15 min., Homogeneous | N/A | N/A |
| RO Water | 90.17 | |
| PEO | 0.0992 | 0.05 |
| Dowicil 200, Roll Mill 10 min., Homogeneous | 0.2001 | 0.1 |
| Glycerol (Glycerine) | 33.90 | 17 |
| Dodecylbenzenesulfonic Acid Sodium Salt | 1.96 | 1.0 |
| Project Cyan 1 Liquid (10% Direct Blue 199 Dye Solids) | 30 | 1.5 |
| DUASYN Acid Blue | 2.99 | 1.5 |
| Roll Mill 20 min., Homogeneous | N/A | N/A |
| pH 7.24 | N/A | N/A |
| Ink Weight 190.66 g, RO Water to 200 g ink, Roll mill 10 min. | 9.12 | |
| Homogeneous, filter 0.2 μm | N/A | N/A |
| Viscosity = 1.82 cP, | | |
| Surface Tension = 30.8 dynes/cm | | |

Filter time of the ink composition with a 0.2 micron ink filter at 60 psi pressure is 9 minutes. The ink produces a mild bubble and the filter is clean. A portion of the ink, 10 grams, is loaded into a print cartridge and the cartridge is placed in a printer. After printing, the print cartridge is removed, decapped and set uncapped for a period of one day. No ink weep is noted. The ink provides good quality printing on a Xerox thermal ink jet transparency though moderate stitching is noted. Dry time is 3 seconds. Recoverability is 5 pages.

TABLE IV (Example 4)

| INGREDIENT/DESCRIPTION - 20 g Ink | Amount, g | Soln. % |
|---|---|---|
| RO Water | 9.69 | |
| EDTA/Tris Solution (6 g Tris/5 g EDTA/ 20 g Water) | 0.62 | 0.5% Tris |
| Glycerol (Glycerine) | 0.24 | 1.2 |
| TMA DBS (low viscosity) | 0.31 | 1.5 |
| Project Cyan 1 Liquid (10% Direct Blue 199 Dye Solids) | 7 | 3.5 |
| Roll Mill 5 min., Homogeneous with moderate foam | N/A | N/A |
| Ink Weight 17.86 g, RO Water to 20 g ink | 2.14 | 10.7 |
| Homogeneous, Drawdown #8 WW8 DT = 3 sec. Viscosity = 1.67 cP, Surface Tension = 33.3 dynes/cm | N/A | N/A |

While the invention has been described with reference to preferred embodiments, the invention is not limited to the specific examples given, and other embodiments and modifications can be made by those skilled in the art without departing from the spirit and scope of the invention and claims.

What is claimed is:

1. An ink jet ink composition, comprising a liquid medium, a colorant, a dodecylbenzenesulfonate salt surfactant with amine based counterions and dipropylene glycol.

2. An ink jet ink composition according to claim 1, wherein said dodecylbenzenesulfonate salt is selected from the group consisting of triethanolammonium, isopropylammonium, tetramethylammonium, and ammonium.

3. An ink jet ink composition according to claim 1, wherein said salt is present in an amount of about 0.2 to about 1.0 weight percent of total ink weight.

4. An ink jet ink composition according to claim 1, wherein said dipropylene glycol is present in an amount of about 8 weight percent to about 20 weight percent of total ink weight.

5. An ink jet ink composition comprising a liquid medium, a colorant, a dodecylbenzenesulfonate salt surfactant with amine based counterions and a co-solvent.

6. An ink jet ink composition according to claim 5, wherein said co-solvent is selected from the group consisting of glycerol, diethylene glycol, ethylene glycol, trimethylol propane, sulfolane, n-methylpyrrolidone, thiodiethanol, and imidazole.

7. An ink jet ink composition according to claim 5, wherein said salt is present in an amount of about 0.2 to about 1.0 weight percent of total ink weight.

8. An ink jet ink composition according to claim 5, wherein said co-solvent is present in an amount of about 8 to about 20 weight percent of total ink weight.

9. An inkjet printing process comprising ejecting an inkjet ink composition containing a liquid vehicle, a co-solvent, a colorant and a dodecylbenzenesulfonate salt surfactant with amine based counterions in an imagewise fashion from an ink jet printer onto a substrate.

10. The ink jet printing process of claim 9, wherein said dodecylbenzenesulfonate salt is selected from the group consisting of triethanolammonium, isopropylammonium, tetramethylammonium, and ammonium.

* * * * *